US006293979B1

(12) United States Patent
Choudhary et al.

(10) Patent No.: US 6,293,979 B1
(45) **Date of Patent: *Sep. 25, 2001**

(54) PROCESS FOR THE CATALYTIC CONVERSION OF METHANE OR NATURAL GAS TO SYNGAS OR A MIXTURE OF CARBON MONOXIDE AND HYDROGEN

(75) Inventors: Vasant Ramchandra Choudhary; Balu Shivaji Uphade; Ajit Singh Mamman, all of Pune-411008; Amarjeet Munshiram Rajput, Pune-411036, all of (IN)

(73) Assignee: Council of Scientific & Industrial Research, New Delhi (IN)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/020,115

(22) Filed: Feb. 6, 1998

Related U.S. Application Data

(63) Continuation of application No. 08/372,650, filed on Jan. 13, 1995, now abandoned, and a continuation-in-part of application No. 08/517,213, filed on Aug. 21, 1995, now Pat. No. 5,744,419, and a continuation-in-part of application No. 08/359,035, filed on Dec. 19, 1994, now abandoned.

(51) Int. Cl.[7] .......... C01B 3/26

(52) U.S. Cl. .......... 48/198.7; 48/127.7; 423/654; 423/653; 423/651

(58) Field of Search .......... 48/198.7, 127.7, 48/197 R, 198.1, 198.5; 252/373; 423/650, 651, 652, 653, 654

(56) References Cited

U.S. PATENT DOCUMENTS

| | | | | |
|---|---|---|---|---|
| 2,942,958 | | 6/1960 | Dwyer | 48/198.7 |
| 4,877,550 | | 10/1989 | Goetsch et al. | 252/373 |
| 4,888,131 | | 12/1989 | Goetsch et al. | 252/373 |
| 4,988,661 | * | 1/1991 | Arai et al. | 502/327 |
| 5,023,276 | * | 6/1991 | Yarrington et al. | 514/703 |
| 5,395,406 | * | 3/1995 | Clavenna et al. | 48/198.7 |
| 5,431,855 | * | 7/1995 | Green et al. | 252/373 |
| 5,741,440 | * | 4/1998 | Cooper et al. | 252/373 |
| 5,744,419 | | 4/1998 | Choudhary et al. | 502/326 |
| 5,752,995 | * | 5/1998 | Kang | 48/198.7 |
| 5,855,815 | * | 1/1999 | Park et al. | 252/373 |

FOREIGN PATENT DOCUMENTS

| | | |
|---|---|---|
| 84273A2 | 7/1983 | (EP) . |
| 303438A2 | 5/1989 | (EP) . |

OTHER PUBLICATIONS

V.R. Choudhary et al., "Oxidative Conversion of methane to Syngas Over Nickel Supported on Commercial Low Surface Area Porous Catalyst Carriers Precoated with Alkaline and Rare Earth Oxides", Feb. 18, 1997, Journal of Catalysis 172, pp. 281–293.

V.R. Choudhary et al., "Simultaneous steam and $CO_2$ reforming of methane to syngas over MiO/MgO/SA–5205 in presence and absence of oxygen", Jun. 13, 1997, Applied Catalysis A: General 168, pp. 33–46.

V.R. Choudhary et al., "Large Enhancement in Methane–to–Syngas Conversion Activity of Supported Ni Catalysts due to Precoating of Catalyst Supports with MgO, CaO or Rate–earth Oxide", Aug. 1994, *Catalysis Letters 32*, (1995), pp. 387–390.

N.M. Gupta et al., Oxidative Conversion of Methane to Syngas With or Without Simultaneous Steam and/or $CO_2$ Forming over Supported NiO–MgO, NiO–CaO and NiO–$Yb_2O_3$ Catalysts, *Catalysis: Modern Trends*, 1995, pp. 380–383.

Kirk & Otmer, Encyclopaedia of Chemical Technology, 3rd Edn., 1990, vol. 12, p. 951.

Ulmann's Encyclopaedia of Industrial Chemistry, 5th Edn., 1989, vol. A12, p. 186, 202.

Dissanayake et al., Journal of Catalysis, 1991, vol. 132, p. 117.

* cited by examiner

*Primary Examiner*—Hien Tran
*Assistant Examiner*—Basia Ridley
(74) *Attorney, Agent, or Firm*—Christie, Parker & Hale, LLP

(57) ABSTRACT

A process for catalytic conversion of methane or natural gas to syngas using a supported catalyst containing oxides of nickel and cobalt with of without noble metals. Efficiency of the catalytic process is increased by simultaneously carrying out an exothermic oxidation reaction and an endothermic steam and carbon dioxide reforming reaction over the supported catalyst. The catalyst is prepared by depositing oxides of nickel and cobalt, with or without noble metals, on a sintered low surface area porous inert support. Surface of the support is precoated with an oxide of Be, Mg, Ca or a mixture thereof so that a protective layer of alkaline earth oxide is formed between the oxides of nickel and cobalt and the support, and hence, direct chemical interactions between the oxides of nickel and cobalt and reactive components of the support, which leads to formation of catalytically inactive binary oxide phases, are avoided.

7 Claims, No Drawings

PROCESS FOR THE CATALYTIC CONVERSION OF METHANE OR NATURAL GAS TO SYNGAS OR A MIXTURE OF CARBON MONOXIDE AND HYDROGEN

This application is a continuation of nonprovisional application Ser. No. 08/372,650, filed on Jan. 13, 1995, now abandoned, and continuation-in-part of nonprovisional application Ser. No. 08/517,213, filed on Aug. 21, 1995, now U.S. Pat. No. 5,744,419 and continuation-in-part of nonprovisional application Ser. No. 08/359,035, filed on Dec. 19, 1994, now abandoned.

This invention relates to a process for the catalytic conversion of methane or natural gas to syngas (i.e. a mixture of carbon monoxide and hydrogen). The process is an energy efficient one using an improved supported catalyst containing oxides of nickel and cobalt, with or without noble metals. This invention particularly relates to a process for the catalytic conversion of methane or natural gas to syngas in an energy efficient manner using an improved supported catalyst containing oxides of nickel and cobalt, with or without noble metals, deposited on a sintered low surface area porous catalyst carrier (i.e. support) precoated with MgO, CaO or mixture thereof, wherein the exothermic oxidative conversion with oxygen of methane or natural gas to syngas is coupled with the endothermic steam and $CO_2$ reforming of methane or natural gas to syngas by carrying out these reactions simultaneously over the catalyst so that the heat produced in the exothermic reaction is used instantly for the endothermic steam and $CO_2$ reforming reactions thereby making the process most energy efficient and safe and also making the process operably by a simple fixed bed reactor operated adiabatically or non-adiabatically. The improved process of this invention can be used for the production of carbon monoxide and hydrogen (i.e. syngas or synthesis gas) which is a versatile feedstock for the methanol synthesis, ammonia synthesis, ammonia based fertilizers, various industrial carbonylation and hydrogenation processes and for Fischer-Tropsch synthesis of lower olefins, higher alcohols, aldehydes and liquid hydrocarbon fuels etc. The process of this invention could be used by the producers of carbon monoxide, hydrogen, and synthesis gas (or syngas) as well as their users, for examples those produce methanol and methanol-based products, ammonia and ammonia-based chemicals and fertilizers, Fischer-Tropsch synthesis products such as lower olefins, alcohols, aldehydes and liquid hydrocarbon fuels, oxo-synthesis products, reducing gases, town gas, hydrogenation and carbonylation products and reduction gas for production of sponge iron, etc.

BACKGROUND OF THE INVENTION

In the prior art, it is well known that syngas (i.e. CO and $H_2$) can be produced from methane (or natural gas) by following different catalytic processes.

Steam reforming of methane: It is a highly endothermic process and involves following reactions:

Main reaction $CH_4+H_2O{=}CO+3H_2-54.2$ Kcal per mole of $CH_4$ at 800°–900° C.

Side reaction $CO+H_2O{=}CO_2+H_2+8.0$ kcal per mole of CO at 800° C.–900° C.

$CO_2$ reforming of methane: It is also a highly endothermic process and involves the following reactions:

Main reaction $CH+CO{=}2CO+2H_2-62.2$ kcal per mole of $CH_4$ at 800°–900° C.

Side reaction: Reverse water gas shift reaction $CO_2+H_2{=}CO+H_2O-8.0$ kcal per mole of $CO_2$ at 800°–900° C.

Partial oxidation (i.e. Oxidative conversion) of methane: It is an exothermic process and involves following reactions:

Main reaction $CH_4+0.5\ O_2 \rightarrow CO+2H_2+5.2$ kcal per mole of $CH_4$ at 500°–800° C.

Side reaction $CH_4+2O_2 \rightarrow CO_2+2H_2O+191.5$ kcal per mole of $CH_4$ at 500°–800° C.

$CO+H_2O{=}CO_2+H_2$

Use of nickel containing catalysts, particularly nickel (with or without other elements) supported on alumina or other refractory materials, in the above catalytic processes for conversion of methane (or natural gas) to syngas is also well known in the prior art. Kirk and Othmer, Encyclopedia of Chemical Technology, 3rd Ed., 1990, vol. 12, p. 951; Ullmann's Encyclopedia of Industrial Chemistry, 5th Ed., 1989, vol. A12, pp. 186 and 202; U.S. Pat. No. 2,942,958 (1960); U.S. Pat. No. 4,877,550 (1989); U.S. Pat. No. 4,888,131 (1989); EP 0 084 273 A2 (1983); EP 0 303 438 A2 (1989); and Dissanayske et al., Journal of Catalysis, vol. 132, p. 117 (1991).

The catalytic steam reforming of methane or natural gas to syngas is a well established technology practiced for commercial production of hydrogen, carbon monoxide and syngas (i.e., a mixture of hydrogen and carbon monoxide). In this process, hydrocarbon feed is converted to a mixture of $H_2$, CO and $CO_2$ by reacting hydrocarbons with steam over a supported nickel catalyst such as NiO supported on alumina at elevated temperature (850° C.–1000° C.) and pressure (10–40 atm) and at steam to carbon mole ratio of 2–5 and gas hourly space velocity of about 5000–8000 per hour.

This process is highly endothermic and hence it is carried out in a number of parallel tubes packed with a catalyst and externally heated by flue gas to a temperature of 980°–1040° C. (Kirk and Othmer, Encyclopedia of chemical Technology, 3rd, Ed., 1990, vol. 12, p. 951, Ullmann's Encyclopedia of Industrial Chemistry, 5th Ed., 1989, vol. A12, p. 186).

The main drawbacks of this process are as follows: It is highly endothermic and operated at high temperature. Hence, it is highly energy intensive. Further, the water gas reaction occurring in the process leads to formation of $CO_2$ and $H_2$ from CO and water, thus increasing $H_2$/CO ratio. Since lower $H_2$/CO ratio than that obtained by the steam reforming is required for certain applications of syngas, secondary reformer using $CO_2$ or $O_2$ oxidants are frequently required to reduce the hydrogen content of syngas produced by the steam reforming. Also, there is a carbon deposition on the catalyst during the steam reforming.

Autothermal catalytic reforming of methane or natural gas with air or oxygen to hydrogen, carbon monoxide and carbon dioxide is also an established technology. In this process, a feed gas mixture containing hydrocarbon, steam and oxygen (or air) is passed through a burner and then the combustion gases are passed over a catalyst, nickel supported on alumina, in a fixed bed reactor at 850°–1000° C. and 20–40 atm. (Ullmann's Encyclopedia of Industrial Chemistry, 5th Ed., 1989, vol. A12, p. 202). This process has following drawbacks: There are large temperature and space velocity variations during start-up and shut-down which leads to abrasion and catalyst disintegration, requiring frequent refilling and removal of the catalyst. This process operates at high temperature and pressure and there is a formation of carbon or coke in the reactor.

U.S. Pat. No. 2,942,958 (1960), disclosed a process for the conversion of a normally gaseous hydrocarbon to carbon monoxide and hydrogen, which comprises preheating of normally gaseous hydrocarbon and steam to a temperature between 538° and 760° C., admixing the preheated gaseous hydrocarbon and steam with oxygen and contacting the resulting admixture with a catalyst which comprises a nickel oxide supported on a refractory material such as zirconia or other refractory metal oxide support in a fixed bed reactor at a reaction temperature between 1800° F. (i.e. 982° C.) and 2200° F. (i.e. 1204° C.) and pressure between 150 and 350 psig, maintaining the mole ratio of oxygen and steam to methane in the feed between 0.3 and 0.7 and between 1 and 2, respectively. The main drawback of this process is that the process operates at very high temperature (i.e., above 982° C.). Another drawback of this process is that it is hazardous to mix oxygen with the preheated mixture of gaseous hydrocarbon and steam.

In U.S. Pat. No. 4,877,550 (1989) and U.S. Pat. No. 4,888,131 (1989), Goetsch et. al. have disclosed a fluid bed process for the production of syngas which comprises reacting a light hydrocarbon feed with steam and oxygen at least about 1750° F. (i.e. 954.4° C.) and about 1700° F. (i.e. 926.7° C.), respectively, in the presence of a supported nickel catalyst, nickel supported on a alumina having particle size in the range of 30–150 microns, in a fluid bed (i.e., fluidized bed) reactor. The main drawbacks of this process are as follows: The process operates at very high temperature. Further, this process involves a use of a fluid bed reactor which is extremely difficult to scale-up, design and operate for the process, particularly at a very high reaction temperature employed in the process. Also, the product gas of the process contains entrained catalyst (i.e. catalyst particles are carried away by the product gases during the process) which is to be removed from the product gases, the entrained catalsyt catalyses side reactions such as water gas reaction leading to the conversion of CO to $CO_2$, thus reducing the selectivity for carbon monoxide during the cooling of the product gases, because the water gas reaction is favoured at lower temperatures.

European Patent EPO 303,438, describes a process for the production of syngas from hydrocarbonaceous feedstock such as natural gas by a catalytic partial oxidation process wherein natural gas is mixed with steam in a steam to carbon molar ratio in the range from 0.3 to 2.0, the natural gas and steam mixture is heated to a temperature in the range from 340° to 650° C., the resulting preheated mixture of natural gas and steam is admixed with oxygen or oxygen containing gas preheated to a temperature from 65° C. 650° C., the mixture of natural gas, steam and oxygen is then passed over a catalyst comprising Pt, Rh, Ir, Os, Ru, Pd, Ni, Cr, Co, Ce, La, and a mixture thereof supported on a monolithic structure containing alumina, zirconia, mullite, aluminium titanate, cordlerite etc., with a space velocity from 20,000 $h^{-1}$ to 500,000 $h^{-1}$ at a reaction temperature in the range from 760° C. to 1090° C. to produce a synthesis gas consisting essentially of hydrogen, carbon oxides and steam. The main drawbacks of this process are as follows: it is hazardous to mix oxygen with the preheated mixture of natural gas and steam. Because of the high steam to carbon mole ratio in the feed, the $H_2$ to CO mole ratio in the product is always above 2.0.

European Patent EPO 084 273 (1983) discloses production of carbon monoxide and hydrogen with $H_2$/CO mole ratio of about 1.0 from $C_2$–$C_4$ olefins and $C_1$–$C_4$ paraffins by their reaction with carbon dioxide using a catalyst containing iron, cobalt or nickel supported on silica at a reaction temperature in the range from 350° to 850° C. and pressure of 1–2 atm. The main drawbacks of this process are as follows: this process involves a highly endothermic reaction of $CO_2$ with hydrocarbons and hence it is a highly energy intensive process. In this process, the $H_2$/CO mole ratio in the product is restricted to about 1.0. Further, it is well-known in the prior art that, in the $CO_2$ reforming of hydrocarbons to syngas, the coke formation on a catalyst is very fast and hence catalyst deactivation due to coking is very fast.

Since the steam reforming (Reaction-1) or $CO_2$ reforming (Reaction-3) of methane or natural gas to syngas is highly endothermic the processes based on the steam and/or $CO_2$ reforming of methane or natural gas to syngas are highly energy intensive. These processes also suffer from the drawback of coke formation and consequently fast catalyst deactivation due to coking in the process. Whereas in case of the oxidative conversion with oxygen of methane or natural gas to syngas, the exothermic and therefore no external energy is required for the conversion of methane or natural gas to syngas and so there is little or no coke formation in the process. However, this process also suffers from a number of severe limitations such as (i) problems of the removal of high exothermic heat of reaction from the reaction zone because a large amount of heat is produced in a very small reaction zone due to high conversion coupled with very high space velocity, (ii) requirement of a complicated reactor e.g. fluidized bed reactor with heat exchangers and consequently very high capital cost and process operation cost; the process in fluidized bed reactor is very difficult to design and scale-up; (iii) further, there is a high possibility of run-away conditions and hence the process is highly hazardous or its operation is not safe.

Apart from the limitations of the earlier processes described above, there are following main disadvantages of the supported nickel catalysts described in the prior art for their use in the oxidative conversion of methane or light hydrocarbons to syngas conversion processes described in the prior art.

1) The catalysts are prepared by depositing nickel oxide, with or without other catalytically active metal oxides, directly on refractory supports viz. alumina, silica and zirconia, and calcining at high temperatures. Hence during the calcination, the deposited metal oxides undergo solid-solid reactions with $Al_2O_3$, $SiO_2$ and $ZrO_2$ resulting in the formation of catalytically inactive binary metal oxide phases such as nickel aluminate, nickel silicate and zirconium nickelate, respectively. These binary metal oxide phases are very difficult to reduce and are also catalytically inactive. Even after the reduction of the catalyst to metallic Ni, these inactive binary metal oxide phases reappear during its long operation in the process and also during catalyst regeneration by burning of coke on the catalyst. Therefore, the catalysts have poor stability, low activity and selectivity and also show low efficiency (i.e. productivity for CO and $H_2$) in the methane or light hydrocarbons-to-syngas conversion processes.
2) The catalysts operate at high temperatures, at least at 1700° F. (i.e. 927°), in the oxidative conversion of methane or natural gas to syngas.
3) In most of the cases, the catalysts are reduced by hydrogen before using them in the methane or light hydrocarbons-to-syngas conversion processes.

4) The catalysts when used in unreduced form show activity in the oxidative conversion of methane to syngas only at high temperatures; the reaction is initiated only above 750° C.

In order to overcome the above limitations or drawbacks of supported nickel containing catalysts described in the prior art, an improved catalyst has been developed which has been made the subject matter of our co-pending application Ser. No. 08/359,035, now abandoned.

In the said copending application a process for the preparation of an improved supported catalyst containing oxides of nickel and cobalt, with or without noble metals, deposited on a precoated support, useful for the oxidative conversion of methane, natural gas and biogas to syngas by different processes involving partial oxidation with oxygen or oxidative steam and/or $CO_2$ reforming with oxygen of methane or light hydrocarbons to syngas; the improved supported catalyst is represented by the formula:

$$A_aCo_bNiO_c(x)/MO_d(y)/S,$$

wherein, A is noble metal elements selected from Ru, Rh, Pd, Pt, Ir, Os, or a mixture thereof, Co is cobalt, Ni is nickel, O is Oxygen, M is alkaline earth element selected from Be, Mg, Ca or a mixture thereof, a is A/Ni mole ratio in the range of 0 to about 0.1, b is Co/Ni mole ratio in the range of about 0.01 to about 2.0, c is number of oxygen atoms needed to fulfill the valence requirement of $A_aCo_bNi$, d is the number of oxygen atoms required to fulfill the valence requirement of M, S is a catalyst support selected from sintered low surface area porous refractory inert solids comprising alumina, silica, silica-alumina, silicon carbide, zirconia, hafnia or a mixture thereof, y is weight percent loading of $MO_d$ precoated on the support in the range of about 0.3 wt % to about 30 wt %, and x is wt % loading of $A_aCo_bNiO_c$ deposited on the precoated support in the range of about 0.3 wt. % to about 30 wt. %, and prepared by precoating support with $MO_d$ and then depositing $A_aCo_bNiO_c$ on the precoated support.

Main advantages of the improved supported catalyst over the earlier supported catalysts containing nickel, useful for the conversion of methane or light hydrocarbons to syngas are as follows: (i) The improved supported catalyst is prepared by depositing oxides of nickel and cobalt, with or without noble metals, on a sintered low surface area porous inert support, surface of which is precoated with an oxide of Be, Mg, Ca or a mixture thereof so that a protective layer of the alkaline earth oxide is formed between the support and the oxides of nickel and cobalt, with or without noble metal, and hence direct chemical interactions between the oxides of the Group VIII transition metals and the reactive components of support, which leads to the formation of catalytically inactive binary oxide phases, which are very difficult to reduce, by solid-solid reactions on the support surface are avoided and thereby the catalyst shows much higher activity, selectivity and productivity, operates at lower temperatures and higher space velocities, does not deactivate due to the formation of catalytically inactive binary metal oxide phases in its operation in a long run, and also the catalyst can be used in its unreduced form and the reaction on the unreduced catalyst is initiated or started at much lower temperatures, in the oxidative methane or light hydrocarbons-to-syngas conversion processes. (ii) In the improved supported catalyst, nickel and cobalt are present together producing a synergetic effect thereby increasing resistance to coke deposition on the catalyst and also enhancing its catalytic activity and selectivity in the oxidative methane or light hydrocarbons-to-syngas conversion processes. The addition of cobalt to the catalyst also reduces the reaction start temperature for the catalyst in its unreduced form. (iii) The reaction start temperature of the improved supported catalyst in its unreduced form is further decreased by the presence of noble metal in the catalyst at low concentrations. (iv) Because of the use of a sintered low surface area porous inert support comprising a refractory material, the improved supported catalyst is thermally very stable and also has high mechanical strength and attrition resistance.

The present energy crisis and/or high energy cost and also the environmental pollution problems have created a great need for developing a catalytic process for the conversion of methane or natural gas to syngas, which requires little or no external energy, operates in most energy efficient manner and also has absolutely no hazards (i.e. very safe operation). Hence, there is a need to develop a process for the oxidative conversion of methane or natural gas to syngas in an energy efficient manner using an improved supported catalyst so that a most of the drawbacks or limitations of the earlier processes could be overcome. This invention was therefore, made with the following objects:

1. to provide process for the catalytic conversion of methane or natural gas to syngas (i.e. a mixture of CO and $H_2$) through using the improved supported catalyst disclosed in our copending patent application Ser. No. 08/359,035, now abandoned, which has a number of above mentioned advantages over the earlier supported nickel containing catalysts described in the prior art for the oxidative conversion of methane or light hydrocarbons to syngas.
2. to provide a process for the catalytic conversion of methane or natural gas to syngas in a most energy efficient manner and also in a very safe manner requiring little or no external energy for the conversion through coupling of the exothermic oxidative conversion with oxygen of methane or natural gas to syngas with the endothermic steam and $CO_2$ reforming of methane or natural gas to syngas by carrying out these exothermic and endothermic reactions simultaneously over the improved catalyst in a simple fixed bed reactor operated adiabatically or non-adiabatically.
3. to provide a process for the catalytic conversion of methane or natural gas to syngas, which can be operated continuously at a temperature below 900° C. (i.e. 1652° F.) for a long period of time without deposition of carbon or coke on the catalyst as well as without losing the activity of the catalyst, without lowering its mechanical strength and/or without disintegrating it into powder during application.

SUMMARY OF THE INVENTION

This invention provides a catalytic process for conversion of methane or natural gas to syngas or a mixture of carbon monoxide and hydrogen in a most energy efficient manner in a fixed bed adiabatic or non-adiabatic reactor using an improved supported catalyst containing oxides of nickel and cobalt, with or without noble metals, represented by the formula:

$$A_aCo_bNiO_c(x)/MO_d(y)/S,$$

Wherein, A is noble metal element selected from Ru, Rh, Pd, Pt, Ir, Os, or a mixture thereof, Co is cobalt, Ni is nickel, O is oxygen, M is alkaline earth element selected from Be, Mg, Ca or a mixture thereof, a is A/Ni mole ratio in the range of 0 to about 0.1, b is Co/Ni mole ratio in the range of about 0.01 to about 2.0, C is number of oxygen atoms needed to fulfill the valence requirement of $A_aCo_bNi$, d is number of oxygen atoms required to fulfill the valence requirement of M, S is a catalyst support selected from sintered low surface area porous refractory inert solids comprising alumina, silica, silica-alumina, silicon carbide, zirconia, hafnia or a mixture thereof, y is weight percent loading of $MO_d$ precoated on the support in the range of about 0.3 wt % to about 30 wt %, and x is wt. % loading of $A_aCo_bNiO_c$ deposited on the precoated support in the range of about 0.3 wt. % to about 30 wt. %, and prepared by precoating support with $MO_d$ and then depositing $A_aCo_bNiO_c$ on the precoated support by the catalyst preparation process described and claimed in our co-pending patent application Ser. No. 08/359,035, now abandoned; the catalytic process wherein the exothermic oxidative conversion with oxygen of methane or natural gas to syngas is coupled with the endothermic steam and carbon dioxide reforming of methane or natural gas to syngas by carrying out the exothermic and endothermic reactions simultaneously over the improved support catalyst so that the heat produced in the exothermic reaction is used instantly for the endothermic reactions which makes the process operatable in a most energy efficient manner. The process comprises passing continuously a preheated gaseous feed comprising oxygen, steam, carbon dioxide and methane or natural gas over the improved supported catalyst in a fixed bed reactor operated adiabatically or non-adiabatically at an effective temperature, pressure, feed composition and space velocity such that the overall process is mildly exothermic, thermo-neutral or mildly endothermic and an effluent is produced containing carbon monoxide and hydrogen in mole ratio of hydrogen to carbon monoxide between about 1.5 and about 3.0 and containing less than about 4 mole percent unreacted methane or natural gas.

The main finding of this invention is that the catalytic conversion of methane or natural gas to syngas is achieved in a most energy efficient manner and also in a very safe manner requiring little or no external energy due to coupling of the exothermic oxidative conversion with oxygen of methane or natural gas to syngas with the endothermic steam and carbon dioxide reforming of methane or natural gas to syngas by carrying out these exothermic and endothermic reactions simultaneously over the improved supported catalyst under adiabatic or non-adiabatic conditions in a fixed bed reactor below about 925° C. Because of the fact that the heat produced in the exothermic reactions is instantly used by the endothermic reactions occurring simultaneously over the same catalyst, this process has the following advantages or improvements over the earlier processes: (a) The process is operated in a most energy efficient manner. (b) The process is operated in a very safe manner with no possibility of run-away conditions. (c) The overall conversion process is mildly exothermic, thermo-neutral or mildly endothermic so that the process can be operated adiabatically or non-adiabatically in a simple fixed bed reactor without any serious problem for removing heat from the reactor. (d) When the process is operated in an adiabatic fixed bed reactor, there is no need to remove heat from the reactor or to provide heat to the reactor, several other engineering problems concerning the reactor design, process scale-up and process control are simplified and also the capital and operation cost of the process is much lower.

Another important finding of this invention is that because of the use of the improved supported catalyst in the process, the catalytic conversion of methane or natural gas to syngas is carried out at lower temperature (below 925° C.) and also carried out continuously for a long period of time without catalyst deactivation due to coking, due to poisoning or due to formation of catalytically inactive binary metal oxide phases as well as without lowering the mechanical strength of the catalyst or without disintegrating the catalyst into powder during the operation of the process.

Another, important finding of this invention is that in this process the improved catalyst is used in its unreduced form (as prepared) and the conversion reaction in the process is initiated at low temperature (about 600° C.).

DETAILED DESCRIPTION OF THE INVENTION

Accordingly, this invention provides a catalytic process for the conversion of methane or natural gas to syngas or a mixture of carbon monoxide and hydrogen in an energy efficient manner in a fixed bed reactor operated adiabatically or non-adiabatically using an improved supported catalyst containing oxides of nickel and cobalt, with or without noble metals, represented by the formula:

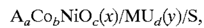

$A_aCo_bNiO_c(x)/MU_d(y)/S$,

Wherein, A is noble metal element selected from Ru, Rh, Pd, Pt, Ir, Os or a mixture thereof, Co is cobalt, Ni is nickel, O is oxygen, M is alkaline earth element selected from Be, Mg, Ca or a mixture thereof, a is A/Ni mole ratio in the range of 0 to about 0.1, b is Co/Ni mole ratio in the range of about 0.01 to about 2.0, c is number of oxygen atoms needed to fulfill the valence requirement of $A_aCo_bNi$, d is number of oxygen atoms required to fulfill the valence requirement to M, S is catalyst support selected from sintered low surface area porous refractory inert solids comprising alumina, silica, silica-alumina, silicon carbide, zirconia, hafnia or a mixture thereof, y is weight percent loading of $MO_d$ precoated on the support in the range of about 0.3 wt % to about 30 wt %, and x is wt % loading of $A_aCo_bNiO_c$ deposited on the precoated support in the range of about 0.3 wt. % to about 30 wt. %, which is prepared by precoating said support with $MO_d$ and then depositing $A_aCo_bNiO_c$ in the precoated support by the catalyst preparation Process described and claimed in our co-pending patent application Ser. No. 08/359,035, now abandoned.

In the catalytic process wherein the exothermic oxidative conversion with oxygen of methane or natural gas to syngas is coupled with the endothermic steam and carbon dioxide reforming of methane or natural gas to syngas by carrying out the said exothermic and endothermic reactions simultaneously over said improved supported catalyst so that the heat produced in the exothermic reaction is used instantly for the endothermic reactions which makes the overall process mildly exothermic, thermo-neutral or mildly endothermic and also operatable a most energy efficient manner, the process comprises:

a) mixing oxygen with carbon dioxide and methane or natural gas at ambient temperature, b) preheating the steam and mixture of oxygen, carbon dioxide and methane or natural gas to a temperature between about 600° C. and about 900° C., c) admixing said preheated steam with said preheated mixture of oxygen, carbon dioxide and methane or natural gas, d) passing continuously the resulting admixture feed over the said improved supported catalyst in a fixed bed reactor operated adiabatically or non-adiabatically, maintaining the mole ratio of organic carbon (i.e.

carbon in hydrocarbon) to oxygen, steam and carbon dioxide in said admixture feed between about 1.8 and about 2.8, between about 1.1 and about 25 and between about 2.0 and about 50, respectively, gas hourly space velocity of said admixture feed between about 2000 $cm^3.g.^{-1}h^{-1}$ and about 200,000 $cm^3.g^{-1}.h^{-1}$, a reaction temperature between about 650° C. and about 925° C., and a pressure between about 1 atm and about 50 atm such that an effluent is produced containing carbon monoxide and hydrogen in a mole ratio of hydrogen to carbon monoxide between about 1.5 and about 3.0 and containing less than about 4 mole percent unreacted methane or natural gas with about 100% selectivity for both CO and $H_2$ in the conversion of methane or natural gas.

The net heat of reactions in the overall process, $H_r$, is between about −10 Kcal per mole of organic carbon converted and about +15 Kcal per mole of organic carbon converted. The reactor effluent or product gas is cooled to a temperature below 500° C. preferably by exchanging heat with the feed gases countercurrent by known methods and then the unconverted methane or natural gas, oxygen, carbon dioxide and water (or steam) are separated from the product gas by known methods and recycled.

The preferred reaction temperature, in the process is between about 750° C. and about 900° C. The preferred pressure employed in the process ranges from about 1.5 atm to about 20 atm. The preferred gas hourly space velocity of feed ranges from about 10,000 $cm^3.g^{-1}.h^{-1}$ to about 100,000 $cm^3.g^{-1}.h^{-1}$. The preferred mole ratio of organic carbon to oxygen, steam and carbon dioxide in the feed ranges from about 2.0 to about 2.4, from about 2.0 to about 10 and from about 3.0 to about 30, respectively. The preferred net heat of reactions in the overall process. $H_r$, ranges from about −5 Kcal per mole of organic carbon converted to about +10 Kcal per mole of organic carbon converted. The preferred adiabatic temperature rise in the process when operated adiabatically ranges from about −150° C. to about +150° C.

For the improved catalyst used in the process, the preferred noble metal, A, is chosen from Rh or Ru; the preferred alkaline earth element, M, is chosen from Mg, Ca or a mixture thereof; the preferred A/Ni mole ratio, a, ranges from about 0 to about 0.05, the preferred Co/Ni mole ratio, b, ranges from about 0.05 to about 1.0; the preferred loading, x, ranges from about 5 wt % to about 20 wt % the preferred loading, y, ranges from about 3 wt % to about 15 wt %; and the support, S, is in the form of granules, spheres, cylindrical pellets, rings, saddles or star-shaped pellets or size in the range of about 1.0 mm to about 15 mm and the surface area, pore volume and porosity of the support ranges from about 0.002 $m^2 \cdot g^{-1}$. to about 5 $m^2 \cdot g^{-1}$, from about 0.05 $cm^3 \cdot g^{-1}$ to about 0.5 $cm^3 \cdot g^{-1}$ and from about 10% to about 70% respectively.

The process can be operated adiabatically in a tubular fixed bed reactor with its length to diameter ratio below 5 or in a radial flow fixed bed reactor or operated non-adiabatically in a multitubular reactor or radial flow reactor with an arrangement for removing heat from the reactor or providing heat to the reactor by known methods. The use of radial flow reactor for the process is preferred particularly when the process is operated at high space velocities to avoid high pressure drop across the catalyst bed.

In the process, the products formed are carbon monoxide (CO) and hydrogen ($H_2$) or syngas as major products and water and carbon dioxide as minor products. The gaseous products stream comprises hydrogen, carbon monoxide, carbon dioxide, water and unconverted methane or natural gas.

The feed used in the process of the invention comprises methane or natural gas, oxygen, steam and carbon dioxide. All the components of the feed are reactants. In the process, following reactions of methane of natural gas with oxygen, steam and carbon dioxide are occurring simultaneously over the same catalyst. (i) Oxidative conversion of methane or natural gas with oxygen to carbon monoxide and hydrogen giving $H_2/CO$ ratio of about 2.0, about 5.2 kcal, heat per mole of organic carbon converted.

(ii) Oxidative conversion of methane or natural gas with oxygen to carbon dioxide and water, which is a highly exothermic reaction, involving evolution of about 191 kcal heat per mole of organic carbon converted.

(iii) Steam reforming of methane or natural gas to carbon monoxide and hydrogen giving $H_2/CO$ ratio of about 3.0, which is highly endothermic reaction, involving an absorption of about 54 kcal heat per mole of organic carbon converted.

(iv) Carbon dioxide reforming of methane or natural gas to carbon monoxide and hydrogen giving $H_2/CO$ ratio of about 1.0, which is also a highly endothermic reaction, involving an absorption of about 62 Kcal heat per mole of organic carbon converted.

(v) Reaction of carbon dioxide with hydrogen to carbon monoxide and water, a reverse shift reaction, which is a mildly endothermic reaction involving an absorption of about 9 Kcal heat per mole of carbon dioxide converted.

(vi) Reaction of steam with carbon monoxide to carbon dioxide and hydrogen, a shift reaction, which is a mildly exothermic reaction involving an evaluation of about 9 Kcal heat per mole of carbon monoxide converted.

Since all the above reactions are occurring simultaneously over the same catalyst, the heat produced in the exothermic reactions is instantly used in the endothermic reactions, thus making the process most energy efficient. Further, it is possible to operate the process such that the overall reaction are either mildly exothermic, thermo-neutral or mildly endothermic so that an occurrence of a run-away condition during the process of the operation can be totally eliminated, thus making the process very safe by manipulating the mole ratio of organic carbon to oxygen, steam, and carbon dioxide in the feed. Further, by manipulating the relative concentration of steam and carbon dioxide in the feed, it is possible to obtain a desired $H_2/C0$ product ratio in the range from about 1.5 to about 3.0 and also it is possible to obtain almost complete conversion of methane of natural gas with 100 percent selectivity for both CO and $H_2$ in the process. A $H_2/CO$ ratio greater than 3.0 can be obtained by using lower $CH_4/H_2O$ ratio and higher $CH_4/CO_2$ ratio in the feed of this process. Also the exothermic heat evolved in the process depends on the concentration of oxygen in the feed and therefore the heat evolved in the process can be controlled by controlling the concentration of oxygen relative to that of other reactant in the feed.

Since the endothermic and exothermic reactions are coupled in the process and thereby the overall process is made mildly exothermic, thermo-natural or mildly endothermic, the adiabatic temperature rise or adiabatic temperature fall in the reactor is small enough to operate the process adiabatically in a fixed bed reactor without providing or without removing heat from the reactor. The process can also be operated under non-adiabatic conditions, using a multibular reactor with an arrangement to provide heat to the reactor or to remove heat from the reactor when the process is made mildly endothermic or mildly exothermic, respectively. However, the operation of the process in an adiabatic fixed bed reactor is referred because of its simplicity in reactor design, process scale-up, process operation, process control and also because of the low capital and process operation cost. In the feed of the said process, air or oxygen enriched air can be used instead of oxygen. However, the use of pure oxygen is preferred to avoid the separation of nitrogen and other components of air from the products.

The present invention reveals that the methane or natural gas can be converted to carbon monoxide and hydrogen in high yields and with very high productivity in a most energy efficient manner by the said process described above. It is obvious that normally gaseous hydrocarbons can also be converted to syngas by this process.

In the process to this invention, above 90% conversion of methane or natural gas with 100% selectivity for both CO and $H_2$ with $H_2$/CO mole ratio in the range from 1.5 to 3.0 and productivity for CO as high as about 2.0 mole $\cdot g^{-1} \cdot h^{-1}$ could be achieved.

The present invention is described with respect to the following examples. These are provided for illustrative purposes only and are not to be construed as limitations on the invention.

Definition of terms used

Total conversion of reactant (%)=mole % of the reactant converted to all the products.

Conversion of a reactant to a particular product×mol % of the reactant converted to the particular product.

Selectivity for a particular product (%)=100×[Conversion of reactant to the product (%)]/[Total conversion of reactant (%)]. Productivity for a particular product ($mol \cdot g^{-1} \cdot h^{-1}$)= moles of the product formed in the process per gram of catalyst per hour. Gas hourly space velocity, GHSV=Volume of gaseous reactant mixture, measured at STP, passed over a unit weight of catalyst per hour.

All the ratios of reactants or products are mole ratios.

Reaction start temperature is defined as the temperature at which methane-to-syngas conversion reaction is started or initiated on the catalyst, when a feed containing reactants are passed over the catalyst and its temperature is increased gradually at a heating rate of about 10° C. $min^{-1}$ from room temperature.

A non-adiabatic reactor or reactor operated non-adiabatically means that heat is removed from the reactor or provided to the reactor by external means to maintain the desired reaction temperature. Whereas, in case of adiabatic reactor no heat is removed from the reactor or provided to the reactor.

The net heat of reactions in the overall process, $\Delta^{\Delta}H_r$, is defined as follows:

Net heat of reactions $\Delta^{66}$ $H_r$=$(\Delta^{\Delta}H_f)$ Products$^{-}$$(\Delta^{\Delta}H_f)$ reactants, where, $(\Delta^{\Delta}H_f)$ products and $(\Delta^{\Delta}H_f)$ reactants are heat of formation of products and reactants, respectively, at the reaction temperature. The negative value of $\Delta^{\Delta}H_r$ indicates that the overall process is exothermic and positive value of $\Delta^{\Delta}H_r$ indicates that the overall process is endothermic.

The adiabatic temperature rise in the process due to reaction is defined as follows:

Adiabatic temperature rise=$(T_p-T_f)$ under adiabatic conditions where $T_p$ and $T_f$ are the temperature of product gas and feed gas, respectively, when no heat is provided to the reactor to removed from the reactor i.e., when the reactor is operated adiabatically.

The adiabatic temperature rise is calculated from the heat produced in the overall process as follows:

$$\text{Adiabatic temperature rise} = \frac{\left(\begin{array}{c}\text{Heat produced per mole of product}\\ \text{gas formed}\end{array}\right)}{E(C_p)_i x_i}$$

Where, $(C_p)_i$ and $x_i$ are the heat capacity at reaction temperature and mole fraction of $i^{th}$ component of product gases.

$E(C_p)_i$ $x_i$ is the heat capacity of the product gas mixture.

EXAMPLE 1

This example illustrates the preparation of an improved support catalyst as follows:

CO0.05NiO1.05(12.2 wt %/MgO (5.6 wt %)/SA 5205.

The catalyst is prepared in two steps as follows:

Step 1: Precoating of support SA 5205 with MgO 60 grams of spherical support SA 5205 obtained from The Norton Co., U.S.A. which comprises 86.1% $Al_2O_3$ and 11.8% $SiO_2$ and has diameter, surface area, pore volume and porosity of 0.6 cm, less than 0.05 $m^2$, $g^{-1}$,0.35 $cm^3 \cdot g^{-1}$ and 54%, respectively, is impregnated with magnesium nitrate by the incipient wetness method by adding to the support 26 ml aqueous solution containing 80.5 gm $Mg(NO_3)_2.6H_2O$. This is followed by drying the impregnated support in air first at 50° C. for 6 h and then at 120° C. for 2 h, decomposing it by heating in air at 500° C. for 4 h and then calcining in air at 900° C. for 4 h. The loading of MgO on the support is 5.6 wt %.

Step 2: Deposition of oxides of nickel and cobalt on the precoated support 83.4 gms of precoated support was then impregnated by the incipient wetness method with a 30 ml aqueous solution containing 33.74 gms $Ni(NO_3)_2.6H_2O$ and 1.69 gms $Co(NO_3)_2.6H_2O$. This is followed by drying the wet mass in air first at 50° C. for 6 h and then at 120° C. for 2 h, decomposing the dried mass by heating in air at 500° C. for 4 h and then calcining in air at 900° C. for 4 h. The loading of the oxides of cobalt and nickel on the precoated support is 12.2 wt %.

EXAMPLE 2

This example illustrates the preparation of an improved support catalyst as follows:

CO0.05NiO1.05 wt %/MgO wt %/SZ5564

The catalyst is prepared in two steps.

Step 1; Precoating of support SZ 5564 with MgO 100 grams of support SZ 5564, in the form of rings with an outer diameter, inner diameter and length of 0.6 cm, 0.2 cm and 0.5 cm, respectively, obtained from The Norton Co., U.S.A., which comprises 94.1% $ZrO_2$, $H_fO_2$, 3.5% CaO, 1.6% $SiO_2$ and 0.4% $Al_2O_3$ and has surface area, pore volume and porosity of less than 0.5 $m^2 \cdot g^{-1}$. 0.15 $cm^3 \cdot g^{-1}$ and 45%, respectively, is impregnated by the incipient wetness method with a 48 ml aqueous solution containing 39.57 gm, $Mg(NO_3)_2.6H_2O$. This is followed by drying the impregnated support in air first at 50° C. for 6 h and then at 120° C. for 2 h decomposing it by heating in air at 490° C. for 4 h and then calcining in air at 900° C. for 4h. The loading of MgO on the support is 5.7 wt %.

Step 2; Deposit of oxides of nickel and cobalt on the precoated support 105.7 gms of the precoated support was then impregnated by the incipient wetness method with a 42 ml aqueous solution containing 40.5 gms $Ni(NO_3)_2.6H_2O$ and 2.03 gms $Co(NO_3)_2.6H_2O$. This was followed by drying the wet mass in air first at 50° C. for 6 h and then at 120° C. for 2 h, decomposing the dried mass by heating in air at 500° C. for 4 h and then calcining in air at 900° C. for 4 h. The loading of the oxides of cobalt and nickel on the precoated support is 9.5 wt %.

EXAMPLE 3

This example illustrates the process for the catalytic conversion of methane to carbon monoxide and hydrogen or syngas in an energy efficient manner in a fixed bed reactor operated non-adiabatically using the following improved catalysts:

$Co_{0.05}$ $NiO_{1.05}$ (12.2 wt %)/MgO(5.6 wt %)SA 5205, the preparation of which is described in Example-1 and $CO_{0.05}$ $NiO_{1.05}$ (9.5 wt %)/MgO (5.7 wt %)/SZ 5564, the preparation of which is described in Example-2.

The catalytic conversion of methane to CO and $H_2$ over the improved catalyst was carried out in a continuous flow tubular fixed bed reactor with a catalyst bed length to catalyst bed diameter ratio of 2.0 by mixing oxygen with methane and carbon dioxide at the ambient temperature and heating the gas mixture to a temperature at 650° C. admixing the preheated gas mixture with steam preheated to a temperature of 650° C. and passing continuously the resulting admixture feed over the improved catalyst at a pressure of 1.5 atm at different process conditions. The reaction temperature was measured by Chromel-Alumel thermocouple located in the catalytic bed. The temperature of preheated admixture of feed gases was measured by a Chromel—Alumel thermocouple located close to the point where the feed enters the reactor. The reactor effluent gases were cooled at about 0° C. to condense the water formed in the reaction using coiled condenser immersed in an ice-water slurry and then analyzed for CO, $CO_2$, $H_2$ and unconverted methane and $O_2$ by an on-line gas chromatograph using a spherocarb column. The process performance was evaluated at the following reaction conditions:

| | |
|---|---|
| Feed | A mixture of $CH_4$, $O_2$, $CO_2$ and Steam |
| $CH_4/O_2$ mole ratio in feed | 2.0– 2.5 |
| $CH_4/CO_2$ mole ratio in feed | 3.0– 24.8 |
| $CH_4/H_2O$ mole ratio in feed | 2.2– 7.8 |
| Total gas hourly space velocity (GHSV) measured at STP | 36,400– 81,200 $cm^3.g^{-1}.h^{-1}$ |
| Reaction temperature | 800° C.– 850° C |

The results obtained on the two catalysts at different process conditions are presented in Tables 1 and 2.

Table 1. Results of the conversion of methane to CO and $H_2$ over CO 0.05 $NiO_{1.05}$ (12.2 wt %) MgO (5.6 wt %)/SA 5202 catalyst, prepared in Example-1, in a fixed bed reactor operated non-adiabatically at different process conditions.

| Run No | feed gas mole ratio $CH_4$/$O_2$ | $CH_4$/$CO_2$ | $CH_4$/$H_2O$ | Feed GHSV ($cm^3g^{-1}h^{-1}$) | Reaction Temp. (° C.) | Conversion % $CH_4$\$O_2$\ | $CO_2$\$H_2O$ | Selectivity in $CH_4$ conversion % $H_2$ | $H_2$/CO ratio in product CO | Productivity of CO (molg$^{-1}$h$^{-1}$) | | Net heat of reaction Δ Hr (Kcal per mole ratio of $CH_4$ converted) | | calculated adibetic temp (0° C.) | |
|---|---|---|---|---|---|---|---|---|---|---|---|---|---|---|---|
| 1 | 2.0 | 24.8 | 5.4 | 36,400 | 850 | 94.8 | 84.4 | 52.0 | 41.0 | 100 | 100 | 2.04 | 0.91 | (+) 1.21 | (−) 37.0 |
| 2 | 2.2 | 4.3 | 4.5 | 40,460 | 800 | 94.1 | 98.4 | 21.4 | 10.3 | 100 | 100 | 1.92 | 0.94 | (−) 0.02 | (+) 0.71 |
| 3 | 2.5 | 3.0 | 3.1 | 43,500 | 800 | 93.5 | 97.4 | 33.1 | 8.4 | 100 | 100 | 1.50 | 0.97 | (+) 5.02 | (−) 154.2 |
| 4 | 2.0 | 7.3 | 7.8 | 37,250 | 850 | 98.5 | 90.2 | 33.1 | 25.4 | 100 | 100 | 2.00 | 0.97 | (+) 0.07 | (−) 2.3 |
| 5 | 2.1 | 16.7 | 2.2 | 81,200 | 825 | 94.2 | 80.1 | 11.2 | 39.9 | 100 | 100 | 2.20 | 1.78 | (+) 6.97 | (−) 192.0 |

Table-2. Results of the conversion of methane to CO and $H_2$ over $CO_{0.05}$ $NiO_{1.05}$(9.5 wt %)/MgO (5.7 wt %)/SZ 5584 catalyst, prepared in Example-2, in a fixed bed reactor operated non-adiabatically at different process conditions.

| Run No | feed gas mole ratio $CH_4$/$O_2$ | $CH_4$/$CO_2$ | $CH_4$/$H_2O$ | Feed GHSV ($cm^3g^{-1}h^{-1}$) | Reaction Temp. (° C.) | Conversion % $CH_4$\$O_2$\ | $CO_2$\$H_2O$ | Selectivity in $CH_4$ conversion % $H_2$ | $H_2$/CO ratio in product CO | Productivity of CO (molg$^{-1}$h$^{-1}$) | | Net heat of reaction Δ Hr (Kcal per mole ratio of $CH_4$ converted) | | calculated adibetic temp (0° C.) | |
|---|---|---|---|---|---|---|---|---|---|---|---|---|---|---|---|
| 1 | 2.0 | 7.4 | 7.8 | 37,400 | 800 | 93.3 | 97.9 | 3.1 | 5.2 | 100 | 100 | 2.00 | 0.89 | (−) 4.19 | (+) 118 |
| 2 | 2.0 | 7.3 | 7.8 | 37,250 | 850 | 98.5 | 96.5 | 41.4 | 17.5 | 100 | 100 | 1.92 | 0.98 | (+) 0.04 | (−) 112 |

-continued

| Run No | feed gas mole ratio $CH_4$/$O_2$ | $CH_4$/$CO_2$ | $CH_4$/$H_2O$ | Feed GHSV ($cm^3g^{-1}h^{-1}$) | Reaction Temp. (° C.) | Conversion % $CH_4$\$O_2$\ $CO_2$\$H_2O$ | Selectivity in $CH_4$ conversion % $H_2$ | $H_2$/CO ratio in product conversion % CO | Productivity of CO ($molg^{-1}h^{-1}$) | Net heat of reaction Δ Hr (Kcal per mole ratio of $CH_4$ converted) | calculated adibetic temp (0° C.) |
|---|---|---|---|---|---|---|---|---|---|---|---|
| 3 | 2.5 | 4.3 | 4.4 | 39,300 | 850 | 97.6 93.9 | 59.7 | 35.9 | 100 100 | 1.82 1.05 | (+) 9.20 (−) 271 |
| 4 | 2.2 | 7.4 | 7.8 | 36,400 | 850 | 95.8 90.9 | 66.6 | 43.3 | 100 100 | 1.88 0.99 | (+) 4.74 (−) 146.5 |
| 5 | 2.2 | 7.4 | 7.8 | 38,400 | 800 | 90.1 90.6 | 36.0 | 20.9 | 100 100 | 1.95 0.89 | (+) 0.67 (−) 197 |
| 6 | 2.2 | 4.3 | 4.5 | 40,450 | 850 | 98.5 91.5 | 39.4 | 35.9 | 100 100 | 1.91 1.02 | (+) 5.98 (−) 174.4 |

The negative and positive value of the net heat of reactions ($H_f$) indicate that the overall process is exothermic and endothermic, respectively. The value of adiabatic temperature rise have been calculated for the case if no heat is provided to the reactor or removed from the reactor. The negative value of calculated adiabatic temperature rise means that there is a temperature fall.

This example also illustrates that the process of this invention can be operated in such a way that the overall process becomes mildly exothermic, nearly thermo-neutral or mildly endothermic. This example further illustrates the possibility of operating the process in a fixed bed reactor under adiabatic conditions as the predicted adiabatic temperature rise or adiabatic temperature fall, estimated from the knowledge of the net heat produced or absorbed in the overall process and the heat capacity of product gas mixture, is small enough to make the adiabatic operation of the process possible.

EXAMPLE 4

This example illustrates the process for the catalytic conversion of methane to CO and $H_2$ or syngas in an energy efficient manner in a fixed bed reactor operated adiabatically using the improved catalyst: $CO_{0.05}$ $NiO_{1.05}$ (12.2 wt %)/MgO(5.6 wt %)/SA 5205, the preparation of which is described in Example-1.

The catalytic conversion of methane to CO and H2 over the improved catalyst is carried out using the reactor and by the procedure similar to that described in Example-3 except that the reactor is operated adiabatically i.e. no heat was removed from the reactor or no heat is provided to the reactor by lagging the reactor heavily and also the preheating temperature of the steam and the mixture of methane, $O_2$ and $CO_2$ used in the feed is different. The process performance in the adiabatic fixed bed reactor was evaluated at the following process conditions:

Feed: A mixture of $CH_4$, $O_2$, $CO_2$ and steam

Preheating temperature of feed: 840° C. and 800° C.

$CH_4$/$O_2$ mole ratio in feed: 2.15 and 2.00

$CH_4$/$CO_2$ mole ratio in feed: 7.16 and 8.0

$CH_4$/$H_2O$ mole ratio in feed: 8.0 and 7.5

Total gas hourly space velocity (GHSV) measured at STP: 43,700 and 37,500 $cm3 \cdot g^{-1} \cdot h^{-1}$ The results obtained at two different process conditions are presented in Table-3.

Table-3: Results of the conversion of methane to CO and $H_2$ over $CO_{0.05}$ $NiO_{1.05}$ (12.2 wt %)/MgO (5.6 wt %)/SA 5205 catalyst, prepared in Example-1, in adiabatic fixed bed reactor

| | RUN-1 | RUN-2 |
|---|---|---|
| $CH_4$/$O_2$ Mole ratio in feed | 2.15 | 2.0 |
| $CH_4$/$H_2O$ Mole ratio in feed | 8.0 | 7.5 |
| $CH_4$/$CO_2$ Mole ratio in feed | 7.6 | 8.0 |
| GHSV of feed ($cm^3.g^{-1}.h^{-1}$) | 43,700 | 37.500 |
| Preheating temp. of feed (0° C.) | 840 | 800 |
| Conversion of $CH_4$ (%) | 91.3 | 97.5 |
| Conversion of $O_2$ (%) | 92.5 | 91.3 |
| Conversion of $CO_2$ (%) | 37.3 | 32.3 |
| Conversion of $H_2O$ (%) | 22.1 | 23.2 |
| Selectivity in $CH_4$ conversion for CO (%) | 100 | 100 |
| Selectivity in $CH_4$ conversion for $H_2$ (%) | 100 | 100 |
| $H_2$/CO mole ratio in product | 2.0 | 1.95 |
| Productivity of CO ($mol.g^{-1}.h^{-1}$) | 1.06 | 1.00 |
| Temp. of product gas (° C.) | 804 | 826 |

The main advantages of this invention or major improvements achieved by this invention over the earlier process for catalytic conversion of methane or natural gas to hydrogen and carbon monoxide or syngas are as follows:

1. The feed to the process of this invention comprises of not only oxygen, steam and methane or natural gas but also comprises of carbon dioxide and thereby methane or natural gas is converted by its simultaneous reaction with oxygen, steam and carbon dioxide, yielding syngas with hydrogen to carbon monoxide mole ratio of not only above 2.0, but also below 2.0, depending upon the relative concentration of steam and carbon dioxide in the feed.
2. In the process of this invention the hazard due to a formation of an explosive mixture during the mixing of oxygen with methane or natural gas containing feed is avoided by mixing oxygen with carbon dioxide and methane or natural gas at ambient temperature which is much below the ignition temperature of methane or natural gas.
3. In the process of this invention an improved supported catalyst containing nickel and cobalt, with or without noble metals, prepared by the process described and claimed in our co-pending patent application Ser. No. 08/359,035, now abandoned, is employed for the catalytic conversion of methane or natural gas to hydrogen and carbon mononxide of syngas. Main advantages of the improved supported catalyst over the earlier supported catalyst containing nickel, useful for the conversion of methane or light hydrocarbons to syngas are as follows:

(i) The improved supported catalyst is prepared by depositing oxides of nickel and cobalt, with or without noble metals, on a sintered low surface area porous inert support, surface of which is precoated with an oxide of Be, Mg, Ca or a mixture therof so that a protective layer of the alkaline earth oxide is formed between the support and the oxides of nickel and cobalt, with or without noble metals, and hence direct chemical interactions between the oxides of the Group VIII transition metals and the reactive components of support, which leads to the formation of catalytically inactive binary oxide phases, which are very difficult to reduce, by solid—solid reactions on support surface are avoided and therby the catalyst shows much higher activity, selectivity and productivity, operates at lower temperatures and higher space velocities, does not deactivate due to the formation of catalytically inactive binary metal oxide phases in its operation in a long run, and also the catalyst can be used in its unreduced form and the reaction on the unreduced catalyst is initiated or started at much lower temperatures, in the oxidative methane or light hydrocarbons-to-syngas conversion processes.

(ii) In the improved supported catalyst, nickel and cobalt are present together producing synergetic effect thereby increasing resistance to coke deposition on the catalyst and also enhancing its catalytic activity and selectivity in the oxidative methane or light hydrocarbons-to-syngas conversion to processes. The addition of cobalt to the catalyst also reduces the reaction start temperature for the catalyst in its unreduced form.

(iii) The reaction start temperature of the improved supported catalyst in its unreduced form is further decreased by the presence of noble metal in the catalyst at low concentrations.

(iv) Because of the use of a sintered low surface area porous inert support comprising of a refractory material, the improved supported catalyst is thermally very stable and also has high mechanical strength and attrition resistance.

4. In the process of this invention, the catalytic conversion of methane or natural gas to syngas is achieved in a most energy efficient manner and also in a very safe manner requiring of little or no external energy due to coupling of the exothermic oxidative conversion with oxygen of methane or natural gas to syngas with the endothermic steam and carbon dioxide reforming of methane of natural gas to syngas by carrying out these exothermic and endothermic reactions simultaneously over the improved supported catalyst under adiabatic or non-adiabatic conditions in a fixed bed reactor below about 925° C. Because of the fact that the heat produced in the exothermic reaction is instantly used by the endothermic reactions occurring simultaneously over the same catalyst, this process has following major advantages/improvements over the earlier processes: (a) The process is operated in a most energy efficient manner. (b) The process is operated in a very safe manner with no possibility of run-away conditions. (c) The overall conversion process is mildly exothermic, thermo-neutral or mildly endothermic so that the process can be operated in a simple adiabatic fixed bed reactor or in a non-adiabatic fixed bed reactor without any serious problem for removing reaction heat from the reactor. (d) When the process is operated in an adiabatic fixed bed reactor, there is no need to remove heat from the reactor or to provide heat to the reactor, several other engineering problems concerning the reactor design, process scale-up and process control are simplified and also the capital and operation of cost of the process is much lower.

5. In the process of this invention, the conversion of methane or natural gas to syngas over the improved supported catalyst is carried out continuously for a long period of time without catalyst deactivation due to coking, due to poisoning or due to formation of catalytically inactive binary metal oxide phases as well as without lowering the mechanical strength of the catalyst or without disintergrating the catalyst into powder during the operation of the process.

6. In the process of this invention, the effluent product gases do not contain entrained fine catalyst particles and hence the catalytic side reactions, which cause a reduction in the selectivity for carbon monoxide, during the cooling of the product gas stream are eliminated.

We claim:

1. A process for catalytic conversion of methane or natural gas to syngas or a mixture of carbon monoxide and hydrogen using a supported catalyst comprising a layer of alkaline earth metal oxide on an inert refractory solid support, said catalyst containing oxides of nickel and cobalt, with or without noble metals, represented by the formula:

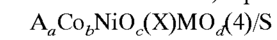

$A_aCo_bNiO_c(X)MO_d(4)/S$ wherein, A is noble metal element selected from the group consisting of Ru, Rh, Pd, Pt, Ir, Os and a mixture thereof, Co is cobalt, Ni is nickel, O is oxygen, M is alkaline earth metal selected from the group consisting of Be, Mg, and a mixture thereof, a is A/Ni mole ratio in the range of 0 to about 0.1; b is a Co/Ni mole ratio in the range of about 0.01 to about 2.0, c is number of oxygen atoms needed to fulfill the valence requirement of $A_aCo_bNi$, d is number of oxygen atoms required to fulfill the valence requirement of M, S is the support for said catalyst selected from the group of sintered porous refractory inert solids consisting of alumina, silica, silica-alumina, silicon carbide, zirconia, hafnia and a mixture thereof said support having a surface area in the range of about 0.002 $m^2g^{-1}$ to about 5.0 $m^2g^{-1}$, y is weight percent loading of $MO_d$ precoated on said support in the range of about 0.3 wt % to about 30 wt %, and x is wt % loading of $A_aCo_bNiO_c$ deposited on the precoated support in the range of about 0.3 wt. % to about 30 wt. %, which comprises:

a) providing a feed stock mixture at ambient temperature by mixing oxygen with carbon dioxide and with methane or natural gas, wherein said feed stock mixture has mole ratio of $CH_4/CO_2$ from 3 to 24.8;

b) preheating water or steam and the feed stock mixture of step (a) to a temperature between about 600° C. and about 900° C, c) admixing said preheated water or steam with said preheated feed stock mixture to create admixture feed, wherein said preheated water or steam is a main reactant;

d) passing continuously the resulting admixture feed of step (c)

over said supported catalyst in a fixed bed reactor operated adiabatically or non-adiabatically, and maintaining mole ratio of organic carbon to oxygen and steam in said admixture feed in step (c) between about 1.8 and about 2.8 and between about 1.1 and about 25, respectively, a gas hourly space velocity of said admixture feed between about 2000 $cm^3g^{-1}h^{-1}$ and about 200,000 $cm^3g^{-1}h^{-1}$, a reaction temperature between about 650° C. and about 925° C. and a pressure between about 1 atm and about 50 atm, such that an effluent is produced containing carbon monoxide and hydrogen, said effluent having a mole ratio of hydrogen to carbon monoxide of between about 1.5 and about 3.0 and containing less than about 4 mole % of methane or natural gas, wherein the catalytic conversion of methane or natural gas has 100 percent for both, CO and $H_2$, and wherein in said fixed bed reactor there is a coupling of exothermic oxidative conversion of methane by $O_2$ and endothermic reforming of methane by both steam and $CO_2$ due to simultaneous occurence of these exothermic and endothermic reactions, with a net heat of reactions in the overall process, $H_r$, of between about −10 kcal per mole of organic carbon converted and about +15 kcal per mole of organic carbon converted.

2. A process as claimed in claim 1 wherein the reaction temperature is between about 750° C. and about 900° C.

3. A process as claimed in claim 1 wherein the pressure ranges from about 1.5 atm to about 20 atm.

4. A process as claimed in claim 1 wherein the gas hourly space velocity of said admixture feed ranges from about 10,000 $cm^3g^{-1}h^{\cdot -1}$ to about 100,000 $cm^3g^{-1}h^{-1}$.

5. A process as claimed in claim 1 wherein the mole ratio of organic carbon to oxygen and steam in said mixture feel ranges from about 2.0 to about 2.4 and from about 2.0 to about 10, respectively.

6. A process as claimed in claim 1 wherein the net heat of reactions, H, ranges from about −5 kcal per mole of organic carbon converted to about +10 kcal per mole of organic carbon converted.

7. A process as claimed in claim 1 wherein the noble metal, A, is chosen from Ru or Rh; the alkaline earth metal element, M, is Mg; the A/Ni mole ratio, a, ranges from about 0 to about 0.05; the Co/Ni mole ratio, b, ranges from about 0.05 to about 1.0; the loading, x, ranges from about 5 wt % to about 20 wt %; the loading, y, ranges from about 3 wt % to about 15 wt %; the support for the catalyst, S, is in the form of grannules, spheres, cylindrical pellets, rings, saddles or star-shaped pellets, of size in the range of about 1 mm to about 15 mm and the surface area, pore volume and porosity of the support for the catalyst ranges from about 0.002 $m^2 \cdot g^{-1}$ to about 5 $m^2 \cdot g^{-1}$, from about 0.05 $cm^3 \cdot g^{-1}$ to about 0.5 $cm^3 \cdot g^{-1}$ and from about 10% to about 70%, respectively.

* * * * *